United States Patent
Suzuki et al.

(10) Patent No.: US 6,886,235 B2
(45) Date of Patent: May 3, 2005

(54) JOINT DEVICE AND METHOD OF PRODUCING ITS HOUSING

(75) Inventors: Yoshihiro Suzuki, Shizuoka (JP); Kouichi Fujita, Shizuoka (JP); Yasuhiro Kizaki, Tokyo (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 47 days.

(21) Appl. No.: 10/398,280

(22) PCT Filed: Oct. 17, 2001

(86) PCT No.: PCT/JP01/09101

§ 371 (c)(1), (2), (4) Date: Apr. 1, 2003

(87) PCT Pub. No.: WO02/42020

PCT Pub. Date: May 30, 2002

(65) Prior Publication Data

US 2004/0025446 A1 Feb. 12, 2004

(30) Foreign Application Priority Data

Nov. 22, 2000 (JP) ........................................ 2000-356315

(51) Int. Cl.[7] ................................................ B23P 13/04
(52) U.S. Cl. ......................................... 29/558; 403/122
(58) Field of Search ................................ 403/122, 135, 403/136, 137, 138; 29/558

(56) References Cited

U.S. PATENT DOCUMENTS

| | | | | |
|---|---|---|---|---|
| 5,087,131 A | * | 2/1992 | D'Andrea | ............... 29/898.051 |
| 5,653,547 A | * | 8/1997 | Teramachi et al. | ........... 403/138 |
| 5,885,022 A | * | 3/1999 | Maughan et al. | ............ 403/135 |
| 6,044,543 A | | 4/2000 | Dorth et al. | |
| 6,085,405 A | | 7/2000 | Kao | |

FOREIGN PATENT DOCUMENTS

| | | |
|---|---|---|
| EP | 0 766 015 A | 4/1997 |
| JP | 63-20137 | 1/1988 |
| JP | 8-90135 A | 4/1996 |
| JP | 10-510615 A | 10/1998 |
| JP | 2001-276956 A | 10/2001 |
| WO | WO 97/12155 A | 4/1997 |

* cited by examiner

*Primary Examiner*—John R. Cottingham
(74) *Attorney, Agent, or Firm*—Darby & Darby

(57) ABSTRACT

The invention concerns a method of manufacturing a joint housing, in particular for vehicle track rods, having an integral shaft with an internal thread designed to hold a longitudinal pin, the housing being produced from a blank with a ball-like enlargement at one end. In order to ensure low manufacturing costs and low consumption of energy and materials, a longitudinal cavity with a diameter exceeding that of the internal thread and a length exceeding that of the threaded section is first produced in the shaft of the blank by rearwards cup extrusion and the diameter of the threaded section subsequently reduced to that of the thread core while at the same time shaping the surface of the wall to give a flat key face, the overall process being a cold-forming one. Finally, both the external and internal features of the housing are produced by heading, cupping, punching and forming to size perpendicular the to longitudinal axis in the region of the enlargement.

6 Claims, 6 Drawing Sheets

JOINT DEVICE AND METHOD OF PRODUCING ITS HOUSING

This is a U.S. national phase application under 35 U.S.C. §371 of International Patent Application No. PCT/JP01/09101 filed Oct. 17, 2001, and claims the benefit of Japanese Patent Application No. 2000-356315 filed Nov. 22, 2000. The International Application was published in Japanese on May 30, 2002 as WO 02/42020 A1 under PCT Article 21(2).

TECHNICAL FIELD

The present invention relates to a joint device provided with a housing that may include a cylindrical arm portion projected from the body portion of the housing. The invention also relates to a method of producing such a housing.

BACKGROUND OF THE INVENTION

Various connecting devices are known conventionally, including ball joint type linkages. A ball joint type linkage is typically used in a stabilizer and has a pair of ball joints, each of which serves as a joint device.

Such a connecting device has a pair of ball joints. Each ball joint is typically assembled from a housing, a generally rod-shaped ball stud, a bearing seat made of synthetic resin, and a dust cover. An example of processes of producing the housing is shown in FIG. 6, wherein (e) illustrates the finished housing. The ball stud, the bearing seat, and the dust cover are not shown in the attached drawings. The housing of each ball joint has a cylindrical body portion 70 and a generally cylindrical arm portion 71, which is provided as an integral body with the body portion 70 and extends from the side, i.e. the cylindrical surface, of the body portion 70. A generally spherical ball head portion provided at an end of the generally rod-shaped ball stud is contained in the body portion 70 of the housing, with the bearing seat disposed between the ball head portion and the body portion 70.

The cylindrical body portion 70 of the housing is formed in a cylindrical shape having an opening 72 and an insertion hole 73 for containing the ball head portion of the ball stud. The stud portion, which integrally extends from the ball head portion of the ball stud, is adapted to be inserted through the opening 72. The housing includes a blocking plate (not shown) to close off the insertion hole 73 so that the inside of the housing serves as an inner chamber for containing the ball head portion. A cover attaching portion having a cylindrical shape is formed along the rim of the opening 72 of the body portion 70. The aforementioned dust cover is fitted and fixed to the cover attaching portion. A stopper portion 75 is formed along the rim of the insertion hole 73 of the body portion 70. The ball joint described above is assembled by placing the ball head portion and the bearing seat in the inner chamber, subsequently crimping the stopper portion 75 inward, and attaching the blocking plate to the housing.

The connecting device also includes a rod-shaped connecting member provided with fitting portions which are generally in the shape of a solid cylinder and respectively located at the two axial ends of the connector portion. Two ball joints respectively assembled as above are connected to the connector portion by snugly inserting each fitting portion of the connector portion into the end of the arm portion 71 of the housing of each ball joint so that there is a given distance between the respective centers of the two ball head portions and, in this state, integrally welding the fitting portions to the respective arm portions 71. Thus, the connecting device is formed.

The process of producing a ball joint housing described above consists of steps described hereunder. First, a rod-shaped working material 80 shown in FIG. 6(a) is undergoes upsetting, in other words, pressure is applied in the axial direction to an axial end of the working material 80 while the other axial end of the working material 80 is secured so that the diameter of the said other axial end and its vicinity remains unchanged. As a result of the upsetting process described above, the earlier mentioned end of the working material 80 is pushed and deformed. Thus, a first-stage intermediate formed body 83 shown in FIG. 6(b) is formed by forging. The first-stage intermediate formed body 83 consists of a stem portion 81 and a head portion 82, which has been formed at an end of the stem portion 81 by the aforementioned deformation and has a diameter greater than the stem portion 81. Then, a generally cylindrical first-stage preliminary body portion 84 which is open at the bottom and closed off at the top is formed by applying pressure to the head portion 82 of the first-stage intermediate formed body 83 in a direction to intersect the axial direction. Thus, a second-stage intermediate formed body 85 shown in FIG. 6(c) is formed by forging. Thereafter, a third-stage intermediate formed body 88 shown in FIG. 6(d) is forged by applying pressure in the axial direction to the first-stage preliminary body portion 84 of the second-stage intermediate formed body 85 to form a cylindrical second-stage preliminary body portion 87 having a preliminary hole 86 at the top thereof. Then, the aforementioned body portion 70 is formed by applying pressure in the axial direction to the second-stage preliminary body portion 87 of the third-stage intermediate formed body 88. The stem portion 81 is formed into the arm portion 71 by boring an axial hole 89 in the stem portion 81 in such a manner that the axial hole 89 extends coaxially with the stem portion 81. Thus, a socket body 91 shown in FIG. 6(e) is formed.

In the course of producing the socket body 91 of the connecting device according to the conventional production process described above and illustrated in FIG. 6, the arm portion 71 of the ball joint housing is formed by boring an axial hole 89 in the stem portion 81, which is in the shape of a solid cylinder. For this reason, the conventional production process hinders improvements in manufacturability.

In order to solve the above problem, an object of the present invention is to provide a joint device which enables improvements in manufacturability. Another object of the present invention is to provide a method of producing a housing of such a joint device.

DISCLOSURE OF THE INVENTION

The present invention provides a method of producing a housing of a joint device to be assembled from said housing, a stud having a stud portion, and a bearing seat, the housing including a tubular body portion and a tubular arm portion having an axial hole bored therein, said body portion having an opening, which permits the stud portion of said stud to be inserted therethrough, and an inner chamber formed as an integral, contiguous body with the opening and adapted to contain a large diameter portion provided at said stud portion in the state where said bearing seat is disposed between the large diameter portion and the inner surface of the inner chamber, and said arm portion projecting from the cylindrical surface of the body portion as an integral body with the body portion so that the axis of the arm portion extends in such a direction as to intersect the axis of the body portion, wherein the process of producing said housing includes a first stage of the process, which calls for applying pressure in a given direction to a columnar working material so as to forge an intermediate formed body comprised of a generally spherical head portion and said tubular arm portion, which projects contiguously from the head portion and has an axis extending in the direction in which the pressure is applied, and a second stage of the process which calls for forging said body portion by applying pressure in such a direction as to intersect the axis of said arm portion to the head portion of said intermediate formed body.

According to the method described above, pressure is applied in a given direction to a working material having a columnar shape in the first stage of the process so as to forge an intermediate formed body comprised of a generally spherical head portion and a tubular arm portion that projects integrally from the head portion and has an axis extending in the direction in which the pressure is applied, and, in the second stage of the process, pressure is applied to the head portion of the intermediate formed body in such a direction as to intersect the direction in which pressure has been applied during the formation of the intermediate formed body, thereby forging a tubular body portion having an axis extending in the direction in which the pressure is applied. Therefore, the process according to the invention is capable of giving the housing great strength that is sufficient to withstand stress applied to the stud portion, even if the stress is applied in the state where the tubular arm portion projects from the body portion that has a relatively irregular surface and contains the large diameter portion of the stud portion. By eliminating the necessity of complicated cutting work, the invention simplifies the production process and thereby improves the manufacturability of the housing.

A joint device according to the invention includes a housing produced by the method of producing the housing of a joint device claimed in claim 1, a stud, and a bearing seat, wherein said stud has a stud portion, which is adapted to be inserted through an opening of said housing, and a large diameter portion, which is formed as an integral body with said stud portion and has a nearly spherical outer shape and a diameter greater than the stud portion; and said bearing seat has a bearing seat hole and is adapted to be contained in the inner chamber of said housing and envelop the large diameter portion of the stud in such a way as to permit the large diameter portion to slide therein, with said stud portion passing through the bearing seat hole.

According to the invention having the feature described above, the aforementioned housing, which is adapted to contain the large diameter portion of the stud with the bearing seat therebetween and has an opening through which the stud portion formed as a contiguous body with the large diameter portion will be inserted, is produced by the method of producing the housing of a joint device claimed in claim 1. Therefore,the feature described above provides a housing having great strength and improved manufacturability.

PREFERRED EMBODIMENT OF THE INVENTION

Next, the configuration of a joint device as an embodiment of the present invention is explained hereunder, referring to the relevant drawings.

Figure 1:
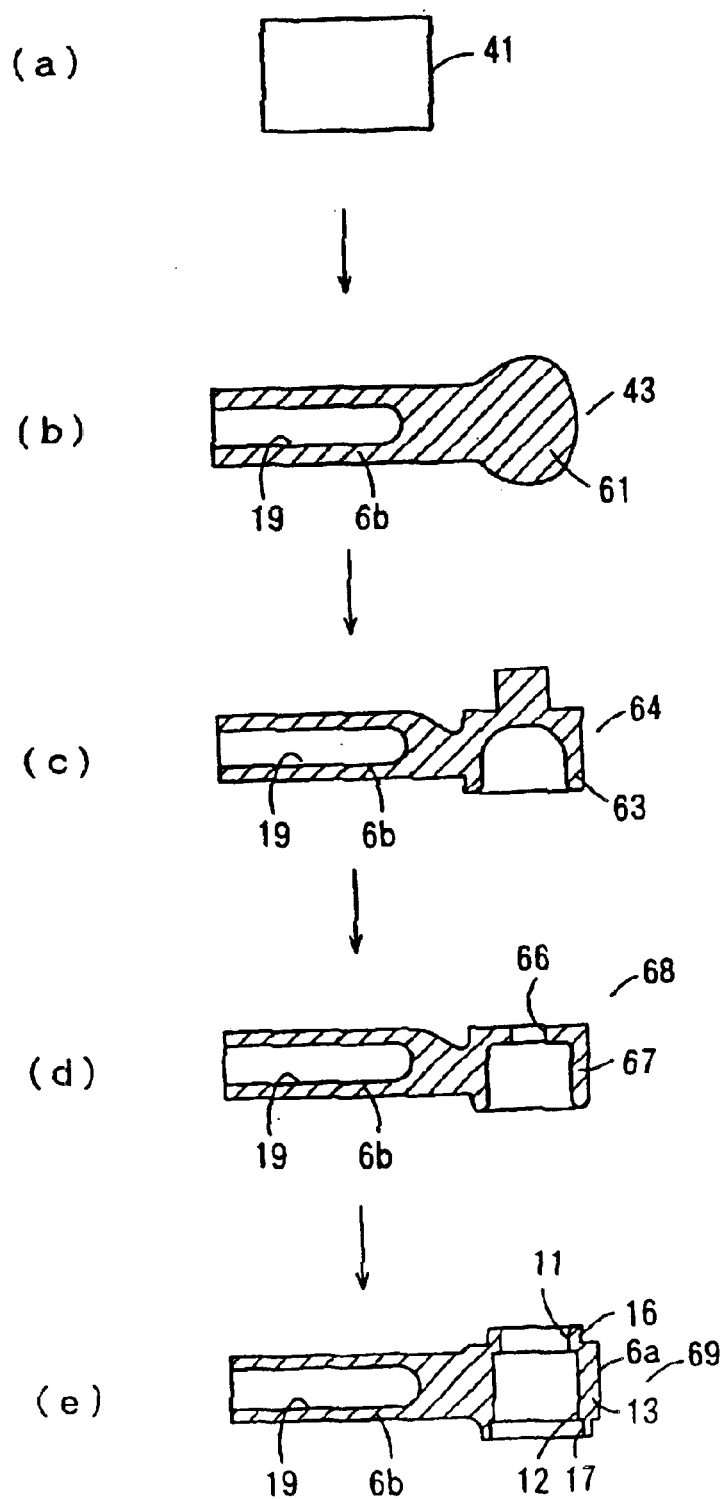
FIG. 1 is a schematic illustration of a process of producing the housing of a ball joint as an embodiment of the present invention.

Referring to FIG. 1, numeral 1 denotes a ball joint as a joint device. The ball joint 1 comprises a metal housing 6 having a generally cylindrical shape with a bottom, a metal ball stud 7 as a stud, a bearing seat 8 formed of synthetic resin, and a dust cover (not shown), which is formed of rubber or a soft synthetic resin into a generally cylindrical shape. The ball joint 1 may be used in, for example, the steering mechanism or the suspension mechanism of an automobile.

The housing 6 may be formed of an aluminum alloy or the like and includes a socket portion 6a and an arm portion 6b extending from the socket portion 6a. The socket portion 6a is formed in a cylindrical shape with a bottom.

The socket portion 6a has a body portion 13 and a disk-shaped bottom face portion 14. The body portion 13 is open at both ends; it has an opening 11 at one end and an insertion hole 12 at the other end. The bottom face portion 14 is integrally attached to the body portion 13 in such a manner as to close off the insertion hole 12. The arm portion 6b projects in a radial direction from the cylindrical outer surface of the body portion 13 as an integral body with the body portion 13 so that the axis of the arm portion 6b extends at nearly a right angle to the axis of the body portion 13.

The body portion 13 includes a cover attaching portion 16 formed along the rim of the opening 11 as an integral body with the body portion 13. The cover attaching portion 16 has a cylindrical shape that is coaxial with the opening 11 and has a diameter smaller than the body portion 13. A contact portion 17 is formed in the cylindrical inner surface of the body portion 13, at a location close to the insertion hole 12, so that that part of the body portion 13 is indented like a step with its inner diameter increased to nearly the same as the outer diameter of the bottom face portion 14. A thin stopper portion 18 is formed along the rim of the insertion hole 12 of the body portion 13.

The arm portion 6b is formed in a cylindrical shape, with an axial hole 19 bored therein. The axial hole 19 extends in the axial direction of the arm portion 6b. An internal thread portion (not shown) is formed in the cylindrical inner surface of the axial hole 19.

The bottom face portion 14 is inserted into the body portion 13 from the insertion hole 12 of the body portion 13 until the rim of the bottom face portion 14 comes into contact with the contact portion 17, and the stopper portion 18 is crimped inward. Thus, the housing 6 having a generally cylindrical shape with a bottom is assembled. The interior of the housing 6 assembled as above serves as an inner chamber 20.

The ball stud 7 is comprised of a spherical ball head portion 21 and a stud portion 23 that are formed as an integral, continuous body. The ball head portion 21 serves as a large diameter portion. The stud portion 23 has a narrow portion 22 located adjacent to the ball head portion 21. An external thread portion 24 is formed at the end of the stud portion 23.

The bearing seat 8 has a thickset cylindrical shape with a bottom and is formed of synthetic resin, such as polyacetal resin or polyurethane resin, that has good bearing characteristics and a great ability to withstand load, as well as sufficient rigidity and elasticity. In other words, the bearing seat 8 has a cylindrical outer surface, with a bearing seat hole 26 formed at one end of the bearing seat 8. The bearing seat hole 26 is adapted to permit the ball head portion 21 of the ball stud 7 to be inserted therefrom into the bearing seat 8 so that the stud portion 23 projects from the bearing seat hole 26. The inner surface of the bearing seat 8 is formed in a nearly spherical surface.

The dust cover is formed in a generally cylindrical shape and provided with a first fitting portion and a second fitting portion, each of which has a ring-like shape. The first fitting portion is provided at one end of the dust cover and adapted to fit to the cover attaching portion 16 of the housing 6. The second fitting portion is provided at the opposite end of the dust cover and adapted to fit to the stud portion 23 of the ball stud 7. The dust cover is attached by fitting the first fitting portion of the dust cover to the cover attaching portion 16 of the housing 6 and fitting the second fitting portion of the dust cover to the stud portion 23 of the ball stud 7. Thus, the ball joint 1 is assembled.

An external thread portion provided at an end of a connector portion, which is not shown in the drawings and may be, for example, a rack-end ball joint or the like, is meshingly engaged with the arm portion 6b of the ball joint 1. Thus, the connecting device serving as a part of a steering mechanism, a suspension mechanism, or the like is formed.

Next, the process of producing the housing 6 of the ball joint 1 according to the embodiment described above is explained hereunder, referring to the relevant drawings.

Figure 3:
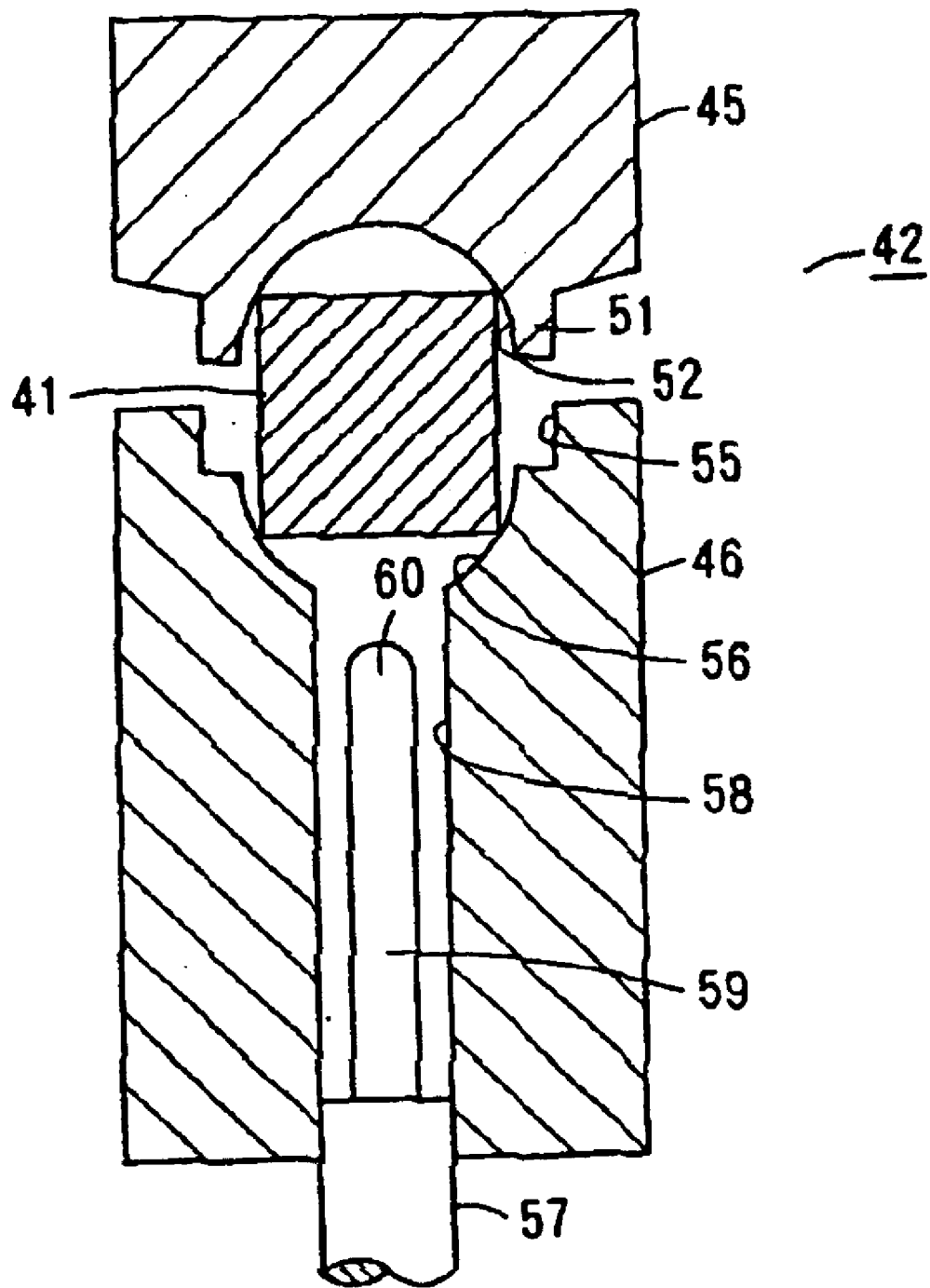
FIG. 3 is a sectional view of an extruder in which the working material of said ball joint is set.
Figure 4:
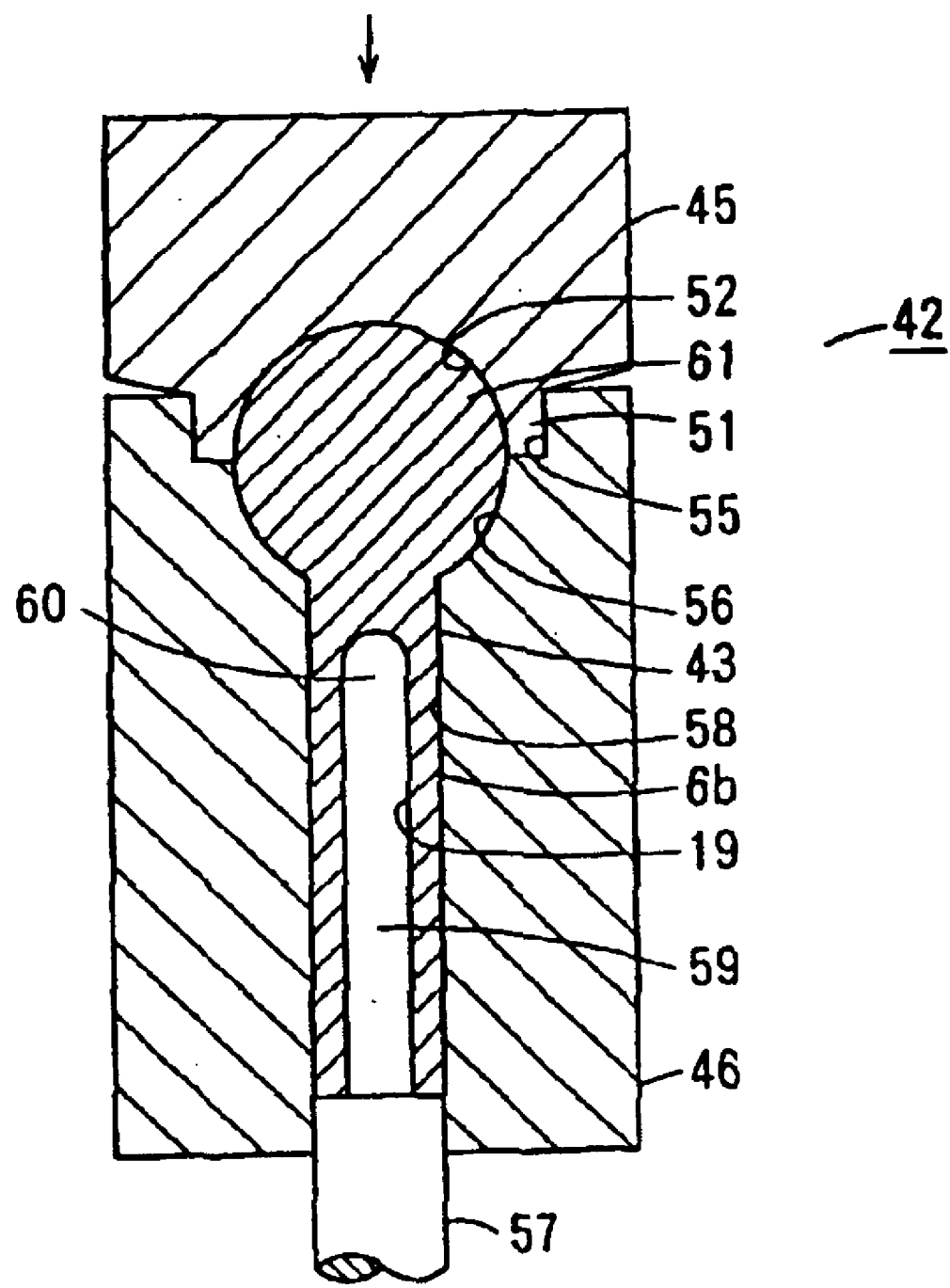
FIG. 4 is a sectional view of said extruder in the state where an extruded molding of said ball joint is formed by the extruder.

The first stage of the process calls for performing extrusion to form an extruded molding 43, which is an intermediate formed body shown in FIG. 1(*a*) and FIG. 4 from a working material 41 made of an aluminum alloy or any other appropriate material by using an extruder 42 shown in FIGS. 3 and 4.

The extruder 42 used for forming the extruded molding 43 by extrusion has an upper die 45 and a lower die 46. The upper die 45 has a generally cylindrical collar 51 protruding downward. The inner surface of the collar 51 is formed into an upper head forming concave 52, which is a generally hemi-spherical concave open at the bottom. The lower die 46 has a cylindrical stepped portion 55 which extend upward and permits the collar 51 of the upper die 45 to snugly fit therein. The central portion of the bottom of the stepped portion 55 is formed into a lower head forming concave 56, which is a generally hemi-spherical concave open at the top. With the collar 51 of the upper die 45 coming into contact with the lower end of the stepped portion of the lower die 46, the upper head forming concave 52 of the upper die 45 and the lower head forming concave 56 of the lower die 46 together form a generally spherical surface. A cylindrical arm forming portion 58 having a vertically extending axis extends from the center portion of the bottom of the lower head forming concave 56 as an integral, contiguous body therewith. An extrusion pin 57 is snugly fitted in the arm forming portion 58 in such a manner as to be capable of moving back and forth. The upper part of the extrusion pin 57 is formed into a hole forming portion 59 having a given length, i.e. the same length as the depth of the axial hole 19 of the arm portion 6b. The diameter of the hole forming portion 59 is smaller than the base portion of the extrusion pin 57 so as to provide a given clearance between the cylindrical outer surface of the hole forming portion 59 and the inner surface of the arm forming portion 58. The distal end of the hole forming portion 59 is formed into a hemispherical guide surface 60.

How the extruded molding 43 described above is formed by extrusion is now explained. First, the working material 41 is set in the lower head forming concave 56 of the lower die 46 as shown in FIG. 3. At that time, the hole forming portion 59 of the extrusion pin 57 is positioned at a given location in the arm forming portion 58 of the lower die 46 so that the upper end of the hole forming portion 59 is below and at a given distance from the underside of the lower head forming concave 56 of the lower die 46.

Thereafter, pressure is applied to the working material 41 in such a direction as to flatten the working material 41 by lowering the upper die 45 so that the collar 51 of the upper die 45 is inserted and snugly fitted in the stepped portion 55 of the lower die 46.

As shown in FIG. 4, the pressure causes the working material 41 to flow until a generally spherical head portion 61 is formed between the upper head forming concave 52 of the upper die 45 and the lower head forming concave 56 of the lower die 46 in the state where the collar 51 of the upper die 45 is in contact with the lower end of the stepped portion 55 of the lower die 46. At the same time, the surplus of the working material 41 is guided by the guide surface 60, which is provided at the end of the hole forming portion 59, to smoothly flow into the space between the arm forming portion 58 of the lower die 46 and the hole forming portion 59 of the extrusion pin 57. Thus, an arm portion 6b having an axial hole 19 is formed by forward extrusion. By following the steps described above, the extruded molding 43 is extruded. The extruded molding 43 is comprised of the arm portion 6b having the axial hole 19 and the head portion 61 integrally extending from an end of the arm portion 6b as shown in FIG. 1(*b*). Thereafter, the extruded molding 43 is removed from the extruder 42 by lifting the upper die 45 and raising the extrusion pin 57 so that the upper end of the extrusion pin 57 protrudes from the lower head forming concave 56 of the lower die 46.

The extruded molding 43 may be formed by applying pressure to the working material 41 to cause the working material 41 to flow in the state where there is a gap of a short distance, e.g. less than 2 mm, between the collar 51 of the upper die 45 and the stepped portion 55 of the lower die 46. At that time, even if a part of the working material 41 flows into the gap and form a wall of burr along the outer surface of the head portion 61, the burr can be removed by cutting or other appropriate means.

Next, the second stage of the process, wherein the extruded molding 43 is formed into the housing 6, is explained hereunder. In the explanation of this stage, the horizontal direction means the axial direction of the arm portion 6b.

First, the extruded molding 43 is set in a pressing machine (not shown). Pressure is then applied in the vertical direction to the head portion 61 so as to forge a first-stage housing blank 64 that has a generally cylindrical first-stage preliminary body portion 63. As shown in FIG. 1(*c*), the first-stage preliminary body portion 63 is open at the bottom and closed off at the top. The aforementioned vertical direction is a direction to intersect the axial direction of the arm portion 6b at an approximately right angle and hereinafter referred to as "the axial direction of the head portion 61".

Pressure is then applied to the first-stage preliminary body portion 63 of the first-stage housing blank 64 in the axial direction of the head portion 61 so as to form a cylindrical second-stage preliminary body portion 67 having a preliminary hole 66 at the top thereof. Thus, a second-stage housing blank 68 shown in FIG. 1(*d*) is formed by forging.

Pressure is then applied to the second-stage preliminary body portion 67 of the second-stage housing blank 68 in the axial direction of the head portion 61 so as to form a body portion 13. Thus, a housing body 69 which is shown in FIG. 1(*e*) and shall be formed into the aforementioned housing 6 is formed by forging.

Then, an internal thread portion is formed in the axial hole 19 of the arm portion 6b of the final-stage housing blank 69.

Figure 2:
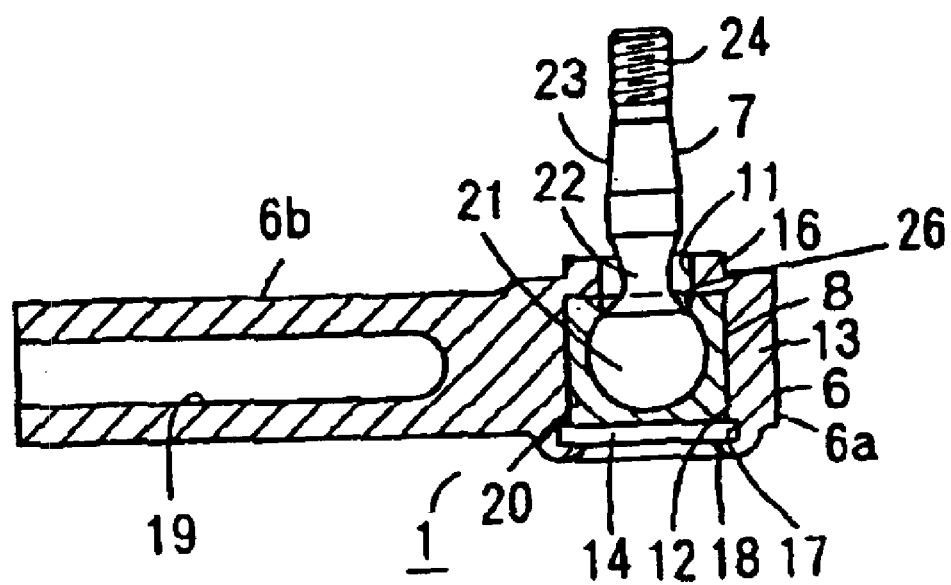
FIG. 2 is a sectional view of said ball joint.

Thereafter, as shown in FIG. 2, the ball head portion 21 of the ball stud 7 is placed in the bearing seat 8, and the ball stud 7 with the bearing seat 8 fitted thereto is inserted from the insertion hole 12 into the body portion 13 with the external thread portion 24 of the stud portion 23 head-first so that the stud portion 23 projects from the opening 11. Thus, the ball head portion 21 of the ball stud 7 is positioned in the body portion 13 together with the bearing seat 8. Thereafter, the disk-shaped bottom face portion 14 is pushed from the insertion hole 12 of the body portion 13 of the final-stage housing blank 69 into the body portion 13 until the rim of the bottom face portion 14 comes into contact with the contact portion 17 and the bearing seat 8, and the stopper portion 18 is crimped inward by using a processing machine (not shown) so that the stopper portion 18 secures the rim of the bottom face portion 14 and thereby prevents unintentional displacement of the face portion 14. Thus, the housing 6 supporting the ball stud 7 is assembled. With the first fitting portion and the second fitting portion of the dust cover (not shown) respectively fitted to the cover attaching portion 16 of the housing 6 and the stud portion 23 of the ball stud 7, the dust cover is attached to the housing 6 and the ball stud 7. Thus, assembly of the ball joint 1 is completed.

According to the embodiment described above, the housing 6 of a ball joint 1 is formed by applying pressure in a given direction to a columnar working material 41 so as to forge an extruded molding 43 comprised of a generally spherical head portion 61 and a cylindrical arm portion 6b that projects integrally from the head portion 61 and has an axis extending in the direction in which the pressure is applied, and then applying pressure to the head portion 61 of the extruded molding 43 in such a direction as to intersect the direction in which pressure has been applied to form the extruded molding 43 so as to forge a cylindrical body portion 13 having an axis extending in the direction in which the pressure is applied. Therefore, even if the housing has such a shape that a cylindrical arm portion 6b projects from a body portion 13 having a relatively irregular surface and adapted to contain the ball head portion 21 of a stud portion 23, the housing 6 having great strength that is sufficient to withstand stress applied to the stud portion 23 can easily be formed by cold forging alone. As there is no need of cutting work, which would complicate the production process, the embodiment improves the manufacturability of the housing. To be more specific, the manufacturability is improved in that the axial hole 19, which serves as a prepared hole for the internal thread portion, can easily be formed by cold forging alone without necessitating cutting work.

Another feature of the embodiment lies in that the housing 6 is forged by using the working material 41 made of an aluminum alloy. This feature enables the easy formation of the housing 6 that is ensured of stable characteristics for a long period of time without fluctuation of the characteristics, even if the housing 6 is used in a vehicle or as any other component that will have to bear a heavy load. It is in this respect that the embodiment improves the manufacturability of the housing.

Another feature of the embodiment lies in that an arm portion 6b having an axial hole 19 is formed by using an extrusion pin 57 adapted to remove an extruded molding 43 from the lower die 46. As this feature enables the formation of a housing by a simple process that uses forging and dies having a simple structures, the embodiment is capable of reducing the production cost of the housing.

As a curved guide surface 60 provided at the end of the extrusion pin 57 protects the end of the extrusion pin 57 from abrasion or other damages and prevents the arm portion 6b from becoming partially thin, the embodiment enables the formation of an arm portion 6b that is ensured of stable characteristics for a long period of time.

Although the invention is explained as above referring to the embodiment, wherein the final-stage housing blank 69 is formed of an aluminum alloy, the final-stage housing blank 69 may be formed of any metal, provided that the metal is capable of flowing upon application of pressure and being consequently formed into an extruded molding 43 which includes a cylindrical arm portion 6b having an axial hole 19 bored therein and that the housing 6 of a ball joint 1 is ensured of given characteristics, including desired strength, resistance to corrosion, and the ability to permit processing, such as crimping of the stopper portion 18. Aluminum alloys, however, are particularly desirable, because they are light in weight and highly malleable.

The arm portion 6b is not required to have a cylindrical shape; any other tubular shapes, including those having oval or polygonal cross sections, are also permissible. The body portion 13 of the housing 6, too, may have any tubular shape.

Although the explanation has been given referring to the embodiment wherein the housing 6 includes a bottom face portion 14 attached to the body portion 13, the housing 6 may be formed as an integral body; for example, the housing 6 may have such a structure as to permit the ball joint to be assembled by inserting the ball head portion 21 of the ball stud 7 into the housing 6 from the opening 11 of the housing 6 and subsequently crimping the vicinity of the opening 11 inward.

Furthermore, the above explanation involves a structure wherein the housing 6 has an inner chamber 20 that has a cylindrical shape with a bottom and is adapted to contain the ball head portion 21 so that the ball stud can be rotatably supported by the housing 6, said ball head portion 21 provided at an end of the stud portion 23. However, the invention is also applicable to joint devices having other structures; for example, the joint device may include a stud having a large-diameter portion that is located at the middle of the stud portion 23 and has a generally spherical outer surface and a diameter greater than the stud portion 23, said stud being fitted in the housing with the large-diameter portion of the stud contained in the body portion 13 and both ends of the stud portion 23 projecting from the body portion 13 in opposite directions.

It is also possible to form the arm portion 6b in such a way that the center of the ball head portion 21 contained in the housing 6 is located on a line extended from the center axis of the arm portion 6b. This structure has a benefit of increasing the buckling strength to withstand load applied to the ball joint 1.

Although only a single arm portion 6b is provided in the embodiment described above, the invention is applicable to various structures involving a plurality of arm portions, including one that calls for providing two arm portion 6b in such a manner as to extend coaxially and project from the head portion 61 in opposite directions.

The invention is explained referring to the above embodiment wherein the joint device is adapted to be connected to the external thread portion provided at an end of a connector portion of a rack-end ball joint or the like by screw engagement and, in this state, functions as a part of a connecting device used in a steering mechanism, a suspension mechanism, or the like. However, the explanation is applicable to any other joint devices.

Although the explanation given as above involves a thickset bearing seat 8, the bearing seat 8 may be formed in any appropriate shape, provided that the head portion 21 can be slidably enveloped therein.

Although the embodiment explained as above includes a dust cover, the embodiment is also applicable to cases where no dust cover is provided.

Figure 5:
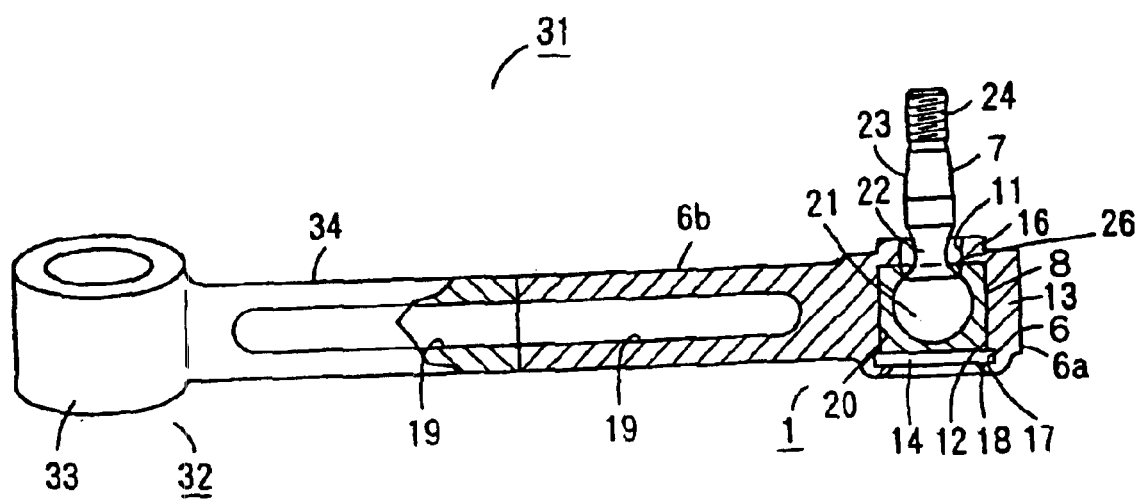
FIG. 5 is a partially cutaway side view of a connecting device according to another embodiment of the present invention.
Figure 6:
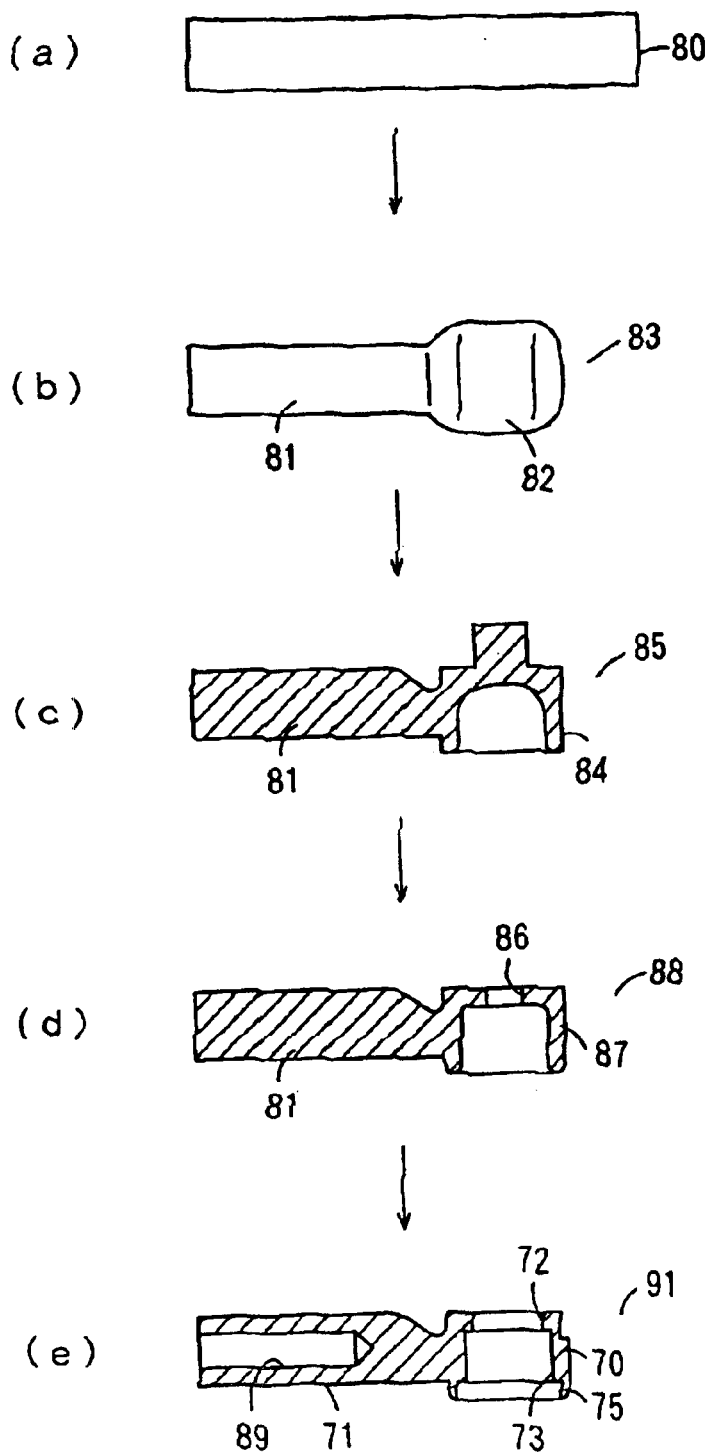
FIG. 6 is a schematic illustration of a conventional production process of the housing of a ball joint.

Next, another embodiment of the invention is explained hereunder, referring to FIG. 5.

In the embodiment shown in FIG. 5, a ball joint 1 having the same configuration as that of the embodiment shown in FIGS. 1 to 4 is used in another connecting device, which is represented by numeral 31 in FIG. 5.

The connecting device 31 has a ball joint 1 and a shaft-supporting portion 32 provided at the end of an arm portion 6b of the ball joint 1. The shaft-supporting portion 32 is formed as an integral body with the arm portion 6b and serves as the housing of the ball joint 1. No internal thread portion is formed in the axial hole 19 of the arm portion 6b of the ball joint 1.

The shaft-supporting portion 32 has a generally cylindrical outer tube portion 33 serving as the body portion, and a generally cylindrical rubber bush (not shown), which is securely fitted in the outer tube portion 33. A shaft member (not shown) is bonded to the rubber bush by vulcanization. In the same manner as in the case of the arm portion 6b of the housing 6 of the ball joint 1, a cylindrical connecting arm portion 34 having an axial hole 19 and serving as an arm portion projects from the cylindrical outer surface of the outer tube portion 33. The shaft-supporting portion 32 is forged in the same manner as forging of the final-stage housing blank 69 that shall be formed into the housing 6 of the ball joint 1. To be more specific, an extruded molding 43 consisting of the aforementioned connecting arm portion 34 and a head portion 61, which is integrally provided at an end of the connecting arm portion 34, is formed as shown in FIGS. 1 to 4, and the outer tube portion 33 is subsequently formed by applying pressure to the head portion 61 in a direction approximately perpendicular to the axis of the connecting arm portion 34 by means of a pressing machine.

Thereafter, the end of the arm portion 6b of the housing 6 of the ball joint 1 and the end of the connecting arm portion 34 of the shaft-supporting portion 32 are welded or otherwise solidly connected to each other in the state that there is a given distance between the center of the ball head portion 21 of the ball joint 1 and the center axis of the shaft member of the shaft-supporting portion 32. Thus, the connecting device 31 is assembled.

According to the embodiment shown in FIG. 5, the shaft-supporting portion 32 can be forged in the same manner as in the case of the final-stage housing blank 69, which shall be formed into the housing 6 of the ball joint 1. Therefore, the embodiment shown in FIG. 5, too, improves the manufacturability of the housing.

As described above, the member to be connected to the arm portion 6b of the housing 6 of the ball joint 1 is not limited to the shaft-supporting portion 32; any member may be connected to the arm portion 6b.

In an alternative arrangement, the shaft-supporting portion 32 may include a connecting protrusion which is in the shape of a solid cylinder protruding from the end of the connecting arm portion 34 coaxially with the connecting arm portion 34 so that the connecting protrusion can be fitted in the axial hole 19 of the arm portion 6b and welded or otherwise connected to the arm portion 6b. An external thread portion adapted to be screwed in the internal thread portion of the arm portion 6b of the ball joint 1 may be formed along the cylindrical outer surface of the connecting protrusion so that the shaft-supporting portion 32 can be connected to the arm portion 6b by screw engagement. In another alternative arrangement, a rod-shaped connecting member having a connecting protrusion at each axial end thereof may be used so that the ball joint 1 and the shaft-supporting portion 32 can be connected by disposing the connecting member between the arm portion 6b of the ball joint 1 and the connecting arm portion 34 of the shaft-supporting portion 32 and welding or otherwise connecting the connecting member to the arm portion 6b and the connecting arm portion 34. It is also possible to form an internal thread portion in the cylindrical inner surface of the arm portion 6b so that the arm portion 6b can be connected to the connecting arm portion 34 by screw engagement. Furthermore, in cases where the arm portion 6b is connected to another member by welding, the presence of the axial hole 19 contributes to reduction of the weight of the arm portion 6b.

As described above, the method of producing the housing of a joint device according to the present embodiment comprises a first stage of the process and a second stage of the process. In the first stage of the process, pressure is applied in a given direction to a working material 41 having a columnar shape so as to forge an extruded molding 43 that serves as the intermediate formed body referred to in the claims and is comprised of a generally spherical head portion 61 and a tubular arm portion 6b. The arm portion 6b projects integrally from the head portion 61 and has an axis extending in the direction in which the pressure is applied. In the second stage of the process, pressure is applied to the head portion 61 of the extruded molding 43 in such a direction as to intersect the direction in which pressure has been applied to form the extruded molding 43 so as to forge a tubular body portion 13 having an axis extending in the direction in which the pressure is applied. By the process described above, the embodiment is ensured to give the housing great strength that is sufficient to withstand stress applied to the stud portion 23 of a stud 7 even if the stress is applied in the state where the tubular arm portion 6b projects from the body portion 13 having a relatively irregular surface and contains the ball head portion 21 of the stud portion 23. As the housing can easily be formed by a simple process that does not necessitate complicated cutting work, the embodiment is also effective in improving the manufacturability of the housing.

Furthermore, as a joint device according to any one of the embodiments uses a housing 6 produced by the method of producing the housing of a joint device described above, the joint device is ensured to have great strength and improved manufacturability.

POSSIBLE INDUSTRIAL APPLICATION

As described above, a joint device and a method of producing its housing according to the invention are applicable to a ball joint typically used in the steering mechanism or the suspension mechanism of an automobile.

What is claimed is:

1. A method of producing a housing of a joint device to be assembled from said housing, a stud having a stud portion, and a bearing seat, said housing including:

a body portion having a tubular shape and provided with an opening and an inner chamber, said opening adapted to permit the stud portion of said stud to be inserted therethrough, and said inner chamber formed as an integral, contiguous body with the opening and adapted to contain a large diameter portion provided at said stud portion in the state where said bearing seat is disposed between the large diameter portion and the inner surface of the inner chamber, and an arm portion that has a tubular shape, provided with an axial hole formed therein, and projecting from a cylindrical surface of the body portion as an integral body with the body portion so that an axis of the arm portion extends in such a direction as to intersect an axis of the body portion, wherein the process of producing said housing includes:

a first stage of the process, which calls for applying pressure in a given direction to a columnar working material so as to simultaneously forge an intermediate formed body comprised of a generally spherical head portion and said tubular arm portion having the axial hole, said tubular arm portion projecting contiguously from said head portion and said axis of said tubular arm portion extending in the direction in which the pressure is applied, and a second stage of the process which calls for forging said body portion by applying pressure in such a direction as to intersect the axis of said arm portion to the head portion of said intermediate formed body.

2. A joint device including:

a housing produced by the method of producing the housing of a joint device claimed in claim 1, a stud having a stud portion, which is adapted to be inserted through an opening of said housing, and a large diameter portion, which is formed as an integral body with said stud portion and has a nearly spherical outer shape and a diameter greater than the stud portion, and a bearing seat which has a bearing seat hole and is adapted to be contained in the inner chamber of said housing and envelop the large diameter portion of the stud in such a way as to permit the large diameter portion to slide therein, with said stud portion passing through the bearing seat hole.

3. A method of producing a housing of a joint device according to claim 1, wherein said first stage of the process occurs by an extruder for forming said intermediate formed body comprised of said generally spherical head portion and said tubular arm portion having said axial hole, said extruder comprising:

two dies, a head forming portion formed between said two dies, an arm forming portion projecting integrally from said head forming portion at one die, and an extrusion pin positioned in said arm forming portion;

wherein said generally spherical head portion is formed by letting said dies come closer to each other so that said dies apply pressure to said working material positioned in said head forming portion, and said tubular arm portion is formed by letting said working material flow into a space between said arm forming portion and said extrusion pin.

4. A method of producing a housing of a joint device according to claim 1, wherein said working material is an aluminum alloy.

5. A method of producing a housing of a joint device to be assembled from said housing, a stud having a stud portion, and a bearing seat, said method comprising the steps of:

simultaneously forging an intermediate formed body comprising a generally spherical head portion and an arm portion having a tubular shape and an axial hole formed therein by applying pressure in a given direction to a columnar working material, said tubular arm portion projecting contiguously from said generally spherical head portion and having an axis extending in the direction in which the pressure is applied, and forging a body portion of the housing by applying pressure in such a direction as to intersect said axis of said arm portion to said head portion of said intermediate formed body, wherein said body portion has a tubular shape and is provided with an opening and an inner chamber, said opening adapted to permit said stud portion of said stud to be inserted therethrough, and said inner chamber formed as an integral, contiguous body with said opening and adapted to contain a large diameter portion provided at said stud portion in the state where said bearing seat is disposed between said large diameter portion and an inner surface of said inner chamber, and said arm portion projects from a cylindrical surface of said body portion as an integral body with said body portion so that said axis of said arm portion extends in such a direction as to intersect an axis of said body portion.

6. A method of producing a housing of a joint device according to claim 5, wherein said step of simultaneously forging said intermediate formed body occurs by an extruder for forming said intermediate formed body comprised of said generally spherical head portion and said tubular arm portion having said axial hole, said extruder comprising:

two dies, a head forming portion formed between said two dies, an arm forming portion projecting integrally from said head forming portion at one die, and an extrusion pin positioned in said arm forming portion;

wherein said step of simultaneously forging said intermediate formed body further comprises the steps of:

forming said generally spherical head portion by letting said dies come closer to each other so that said dies apply pressure to said working material positioned in said head forming portion, and forming said tubular arm portion by letting said working material flow into a space between said arm forming portion and said extrusion pin.

* * * * *